US009551775B2

(12) United States Patent
Rangarajan et al.

(10) Patent No.: US 9,551,775 B2
(45) Date of Patent: Jan. 24, 2017

(54) ENHANCING CLIENT LOCATION VIA BEACON DETECTION

(71) Applicant: Cisco Technology, Inc., San Jose, CA (US)

(72) Inventors: Raghuram Rangarajan, Santa Clara, CA (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 14/476,997

(22) Filed: Sep. 4, 2014

(65) Prior Publication Data

US 2016/0069978 A1   Mar. 10, 2016

(51) Int. Cl.
*H04W 24/00* (2009.01)
*G01S 1/08* (2006.01)
*G01S 5/02* (2010.01)
*H04W 84/12* (2009.01)
*H04W 4/00* (2009.01)
*H04W 4/02* (2009.01)

(52) U.S. Cl.
CPC ............... *G01S 1/08* (2013.01); *G01S 5/0226* (2013.01); *G01S 5/0252* (2013.01); *H04W 4/008* (2013.01); *H04W 4/02* (2013.01); *H04W 84/12* (2013.01)

(58) Field of Classification Search
CPC ........ H04W 4/008; H04W 4/028; H04W 4/04; H04W 4/043; H04W 64/00; H04W 84/12
USPC .................... 455/456.1, 456.2, 456.3, 456.5, 456.6, 455/41.2
See application file for complete search history.

(56) References Cited

U.S. PATENT DOCUMENTS

| 5,642,303 | A  | 6/1997  | Small et al. |
| 8,260,320 | B2 | 9/2012  | Herz |
| 8,284,748 | B2 | 10/2012 | Borghei |
| 8,300,594 | B1 | 10/2012 | Bernier et al. |
| 8,396,485 | B2 | 3/2013  | Grainger et al. |
| 8,458,184 | B2 | 6/2013  | Dorogusker et al. |
| 8,669,902 | B2 | 3/2014  | Pandey et al. |

(Continued)

OTHER PUBLICATIONS

Savvides et al., "Dynamic Fine-Grained Localization in Ad-Hoc Networks of Sensors", Proceeding MobiCom '01 Proceedings of the 7th annual international conference on Mobile computing and networking pp. 166-179, Jul. 2001.

(Continued)

*Primary Examiner* — Jean Gelin
(74) *Attorney, Agent, or Firm* — Edell, Shapiro & Finnan, LLC (57) ABSTRACT

A computing entity, such as a server, obtains a first, second, and third set of measurements based on wireless transmissions between one or more beacon devices, a wireless client device, and one or more wireless access points in a wireless network. The first set of measurements is associated with wireless transmissions from the beacon device(s) received at the wireless access points. The second set of measurements is associated with wireless transmissions between the wireless client device and the wireless access points. The third set of measurements is associated with wireless transmissions from beacon devices received at the wireless client device. An estimated location of the wireless client device is generated based on the first set of measurement data, the second set of measurement data, and the third set of measurement data.

19 Claims, 8 Drawing Sheets

(56) References Cited

U.S. PATENT DOCUMENTS

| | | |
|---|---|---|
| 8,676,182 B2 | 3/2014 | Bell et al. |
| 8,718,644 B2 | 5/2014 | Thomas et al. |
| 2012/0023552 A1 | 1/2012 | Brown |
| 2012/0115512 A1 | 5/2012 | Grainger et al. |
| 2012/0157126 A1* | 6/2012 | Rekimoto ............ G01S 5/0018 455/456.3 |
| 2012/0167207 A1 | 6/2012 | Beckley et al. |
| 2013/0029685 A1* | 1/2013 | Moshfeghi ............ G01S 19/48 455/456.1 |
| 2013/0039391 A1* | 2/2013 | Skarp ................... H04W 4/023 375/148 |
| 2013/0057435 A1 | 3/2013 | Kim |
| 2013/0115916 A1 | 5/2013 | Herz |
| 2013/0203445 A1 | 8/2013 | Grainger et al. |
| 2013/0273938 A1* | 10/2013 | Ng ....................... H04W 64/00 455/456.1 |
| 2013/0317944 A1 | 11/2013 | Huang et al. |
| 2013/0343198 A1 | 12/2013 | Chhabra et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0118113 A1 | 5/2014 | Kaushik et al. |
| 2014/0148196 A1* | 5/2014 | Bassan-Eskenazi .... G01S 11/02 455/456.1 |
| 2014/0191868 A1* | 7/2014 | Ortiz .................... H04W 4/028 340/539.13 |
| 2014/0302869 A1* | 10/2014 | Rosenbaum .......... H04W 4/026 455/456.1 |
| 2015/0087330 A1* | 3/2015 | Prechner .................. G01S 5/14 455/456.1 |
| 2015/0256972 A1* | 9/2015 | Markhovsky ......... H04W 4/023 455/456.1 |
| 2015/0264519 A1* | 9/2015 | Mirzaei ................... H04W 4/02 455/457 |
| 2015/0326704 A1* | 11/2015 | Ko ...................... H04M 1/7253 455/456.3 |
| 2015/0362581 A1* | 12/2015 | Friedman ............. G01S 13/767 455/456.1 |
| 2016/0007315 A1* | 1/2016 | Lundgreen ................ G01S 3/46 455/67.11 |

OTHER PUBLICATIONS

Galvan T. et al., "Wifi bluetooth based combined positioning algorithm," International Meeting of Electrical Engineering Research ENIINVIE 2012, Procedia Engineering 35 (2012), pp. 101-108.

* cited by examiner

ENHANCING CLIENT LOCATION VIA BEACON DETECTION

TECHNICAL FIELD

The present disclosure relates to wireless systems.

BACKGROUND

Wireless beacon devices have been developed to provide additional services to wireless user devices, such as Smartphones and other mobile wireless user devices. As one example, a wireless beacon device may be a low-powered, low-cost transmitter that sends a packet containing information to provide location-based services to wireless user devices. Numerous such beacon devices may be deployed in various indoor and outdoor venues to provide location-based information services, such as advertisements, to wireless user devices.

DESCRIPTION OF EXAMPLE EMBODIMENTS

Overview

A computing entity, such as a server, obtains a first set of measurements associated with wireless transmissions from one or more beacon devices received at one or more wireless access points for a wireless network. A second set of measurements and a third set of measurements are also obtained. The second set of measurement data is associated with wireless transmission between a wireless client device and the one or more wireless access points. The third set of measurement data is associated with wireless transmissions from the one or more beacon devices received at the wireless client device. An estimated location of the wireless client device is generated based on the first set of measurement data, the second set of measurement data, and the third set of measurement data.

Example Embodiments

With the introduction of location-based services, a service provider may benefit from precisely determining the location of wireless client devices. Typically, the location of the client device is determined based on proximity to one or more other wireless devices at known locations. By leveraging information from multiple sources of wireless transmissions, including from sources with unknown locations, the location of client devices may be more precisely estimated.

Figure 1:
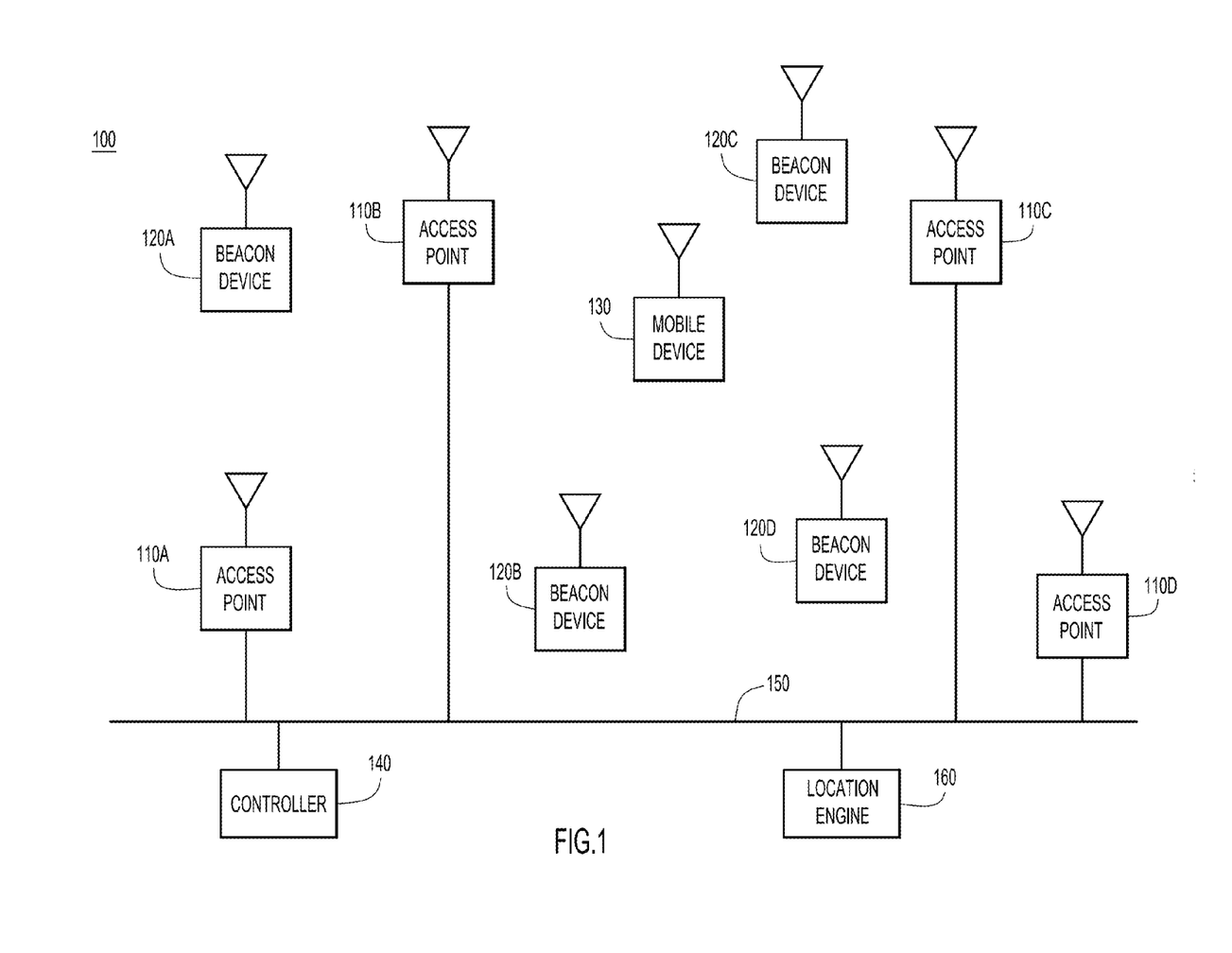
FIG. 1 is a system diagram of a plurality of access points and a plurality of wireless beacon devices that are used to precisely locate a wireless mobile client device, according to an example embodiment.

Referring first to FIG. 1, a system 100 is shown that includes a plurality of access points 110A, 110B, 110C, and 110D that are configured to receive wireless transmissions from beacon devices 120A, 120B, 120C, and 120D, and from wireless mobile client device 130. While only four access points, four beacon devices, and one wireless mobile device is shown, any number of access points, beacon devices and mobile devices may be used in system 100. Hereinafter, the wireless mobile client device may be referred to interchangeably as the mobile device, the client device, or the mobile client device.

The access points 110A, 110B, 110C, and 110D may provide access to a wireless local area network that is managed by a controller 140 via network (e.g., local area network, wide area network, wireless mesh or mixed wired and wireless network) 150. A location engine 160 may also be connected to the access points via the network 150. In one example, the functions of the controller 140 and the location engine 160 may be performed by a single computing device. In further examples, the functions of the controller 140 and location engine 160 may be performed by more than two devices and/or distributed into one or more wireless access points.

The beacon devices 120A, 120B, 120C, and 120D may be any wireless device, that, in one example, are transmit-only capable, and wirelessly transmit advertisements for location-based services for use by wireless mobile devices. In one example, the beacon devices 120A, 120B, 120C, and 120D are small low-cost, wall-powered or battery-powered, wireless devices that are configured to transmit in accordance with a short-range communication standard, e.g., a wireless personal area network (WPAN) communication protocol, such as the Bluetooth wireless communication protocol, and in particular, the advertising mode of the Bluetooth Low Energy (BLE) communication protocol. In one example, the beacon devices transmit packets in accordance with a proprietary packet format. Some Bluetooth devices, such as those that support Bluetooth 4.0, also support the BLE protocol. In another example, the beacon devices transmit advertisements or other information in accordance with the IEEE 802.11/Wi-Fi wireless communication protocol. In general, the beacon devices can operate in accordance with any wireless communication protocol.

In one example, the beacon devices 120A, 120B, 120C, and 120D may be pervasive, small, wireless beacons that can be used to provide location-based services for mobile devices, e.g., mobile device 130, in a venue (e.g., a store, mall, or other public venue). The beacon devices 120A, 120B, 120C, and 120D may be stationary Wi-Fi client devices that send notifications of items nearby that are on sale or items which customers may be looking for, and can enable payments at a point of sale (POS) terminal.

In a further example, the access points 110A, 110B, 110C, and 110D are wireless local area network (WLAN) access points (APs) or sensors/receivers configured to operate in accordance with the IEEE 802.11, aka, Wi-Fi™ wireless communication standard. Some WLAN APs have an extra radio receiver/transceiver that can be used to scan a frequency band (e.g., the 2.4 GHz and/or the 5 GHz frequency bands in the United States) to detect signals from WLAN devices and from non-WLAN devices operating in that frequency band. Thus, WLAN APs can be configured to detect signals from beacon devices that operate in accordance with the BLE protocol. The detection of beacon packet transmissions can be performed with an extra radio receiver/transceiver or with a single radio transceiver (that is also used to serve WLAN traffic).

Figure 2:
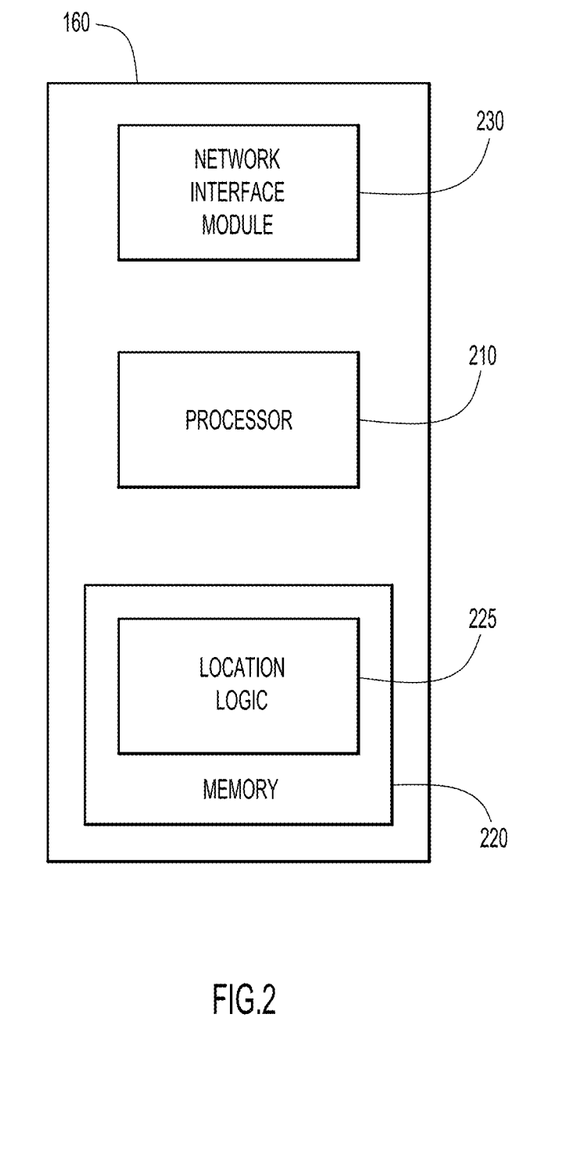
FIG. 2 is a block diagram of a location engine according to an example embodiment.

Referring now to FIG. 2, an example block diagram of the location engine 160 is shown. The location engine 160 includes, among other possible components, a processor 210 to process instructions relevant to estimating the locations of client devices and/or beacon devices, and a memory 220 to store a variety of data and software instructions (e.g., location logic 225). The location engine 160 also includes a network interface unit module 230 to communicate by a wired network with access points 110A, 110B, 110C, and 110D.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
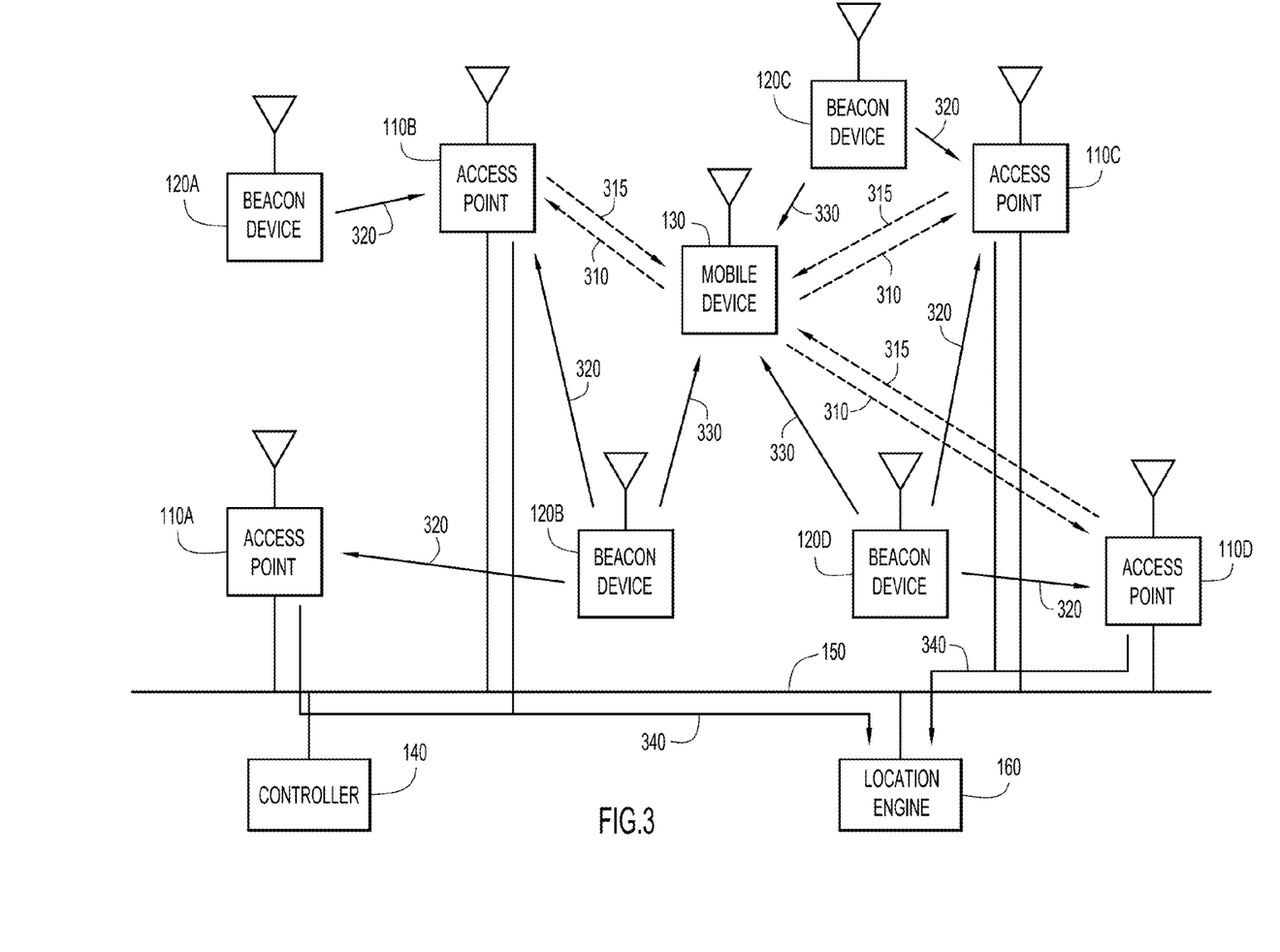
FIG. 3 is a data flow diagram illustrating wireless and wired communications in connection with locating the wireless mobile client device, according to an example embodiment.

Referring now to FIG. 3, a diagram is now described that illustrates an example of the transmissions that may be used to estimate the location of a mobile device and/or beacon devices according to example embodiments presented herein. Wireless transmissions 310 are transmissions from the mobile device 130 that are received by the access points 110B, 110C, or 110D. Wireless transmissions 315 are transmissions from the access points 110B, 110C, or 110D that are received at the mobile device 130. Wireless transmissions 310 and 315 allow for communication between the mobile device 130 and the access points 110B, 110C, and 110D. Wireless transmissions 320 are transmissions emitted by the beacon devices 120A, 120B, 120C, and 120D that are received by one or more of the access points 110A, 110B, 110C, and 110D. Wireless transmissions 330 are transmissions emitted by the beacon devices 120B, 120C, and 120D that are received by the mobile device 130. In one example, transmissions 320 may be the same as (e.g., identical in content to) transmissions 330, with the difference being the device that receives the transmission. The access points 110A, 110B, 110C, and 110D may communicate data associated with reception at the respective access points themselves and/or at the mobile device 130 of the wireless transmissions 310, 315, 320, and/or 330, to the location engine 160 in messages 340.

In one example, the access points may measure the Received Signal Strength Indication (RSSI) of the transmissions 310 as a measure of the distance between each access point and the mobile device, for ultimately computing the location of the mobile device with respect to known locations of the access points. Alternatively, the mobile device may measure the RSSI of the transmissions 315 as a similar measure of the distance between each access point and the mobile device. In a further example, RSSI fingerprinting may be used to estimate a location of the mobile device, as described further below in connection with FIG. 4. In other examples, the distance may be measured through other techniques, such as Time of Flight (TOF), Time Difference of Arrival (TDoA), or Differential Round Trip Time (DRTT). In yet another example, the access points may measure the Angle of Arrival (AoA) of the transmissions received from the mobile device 130 to determine the direction that the mobile device 130 is from each access point. The measured distance and/or direction data may be sent by the respective access points to the location engine 160 in transmissions 340 over network 150 for further computational analysis.

Figure 4:
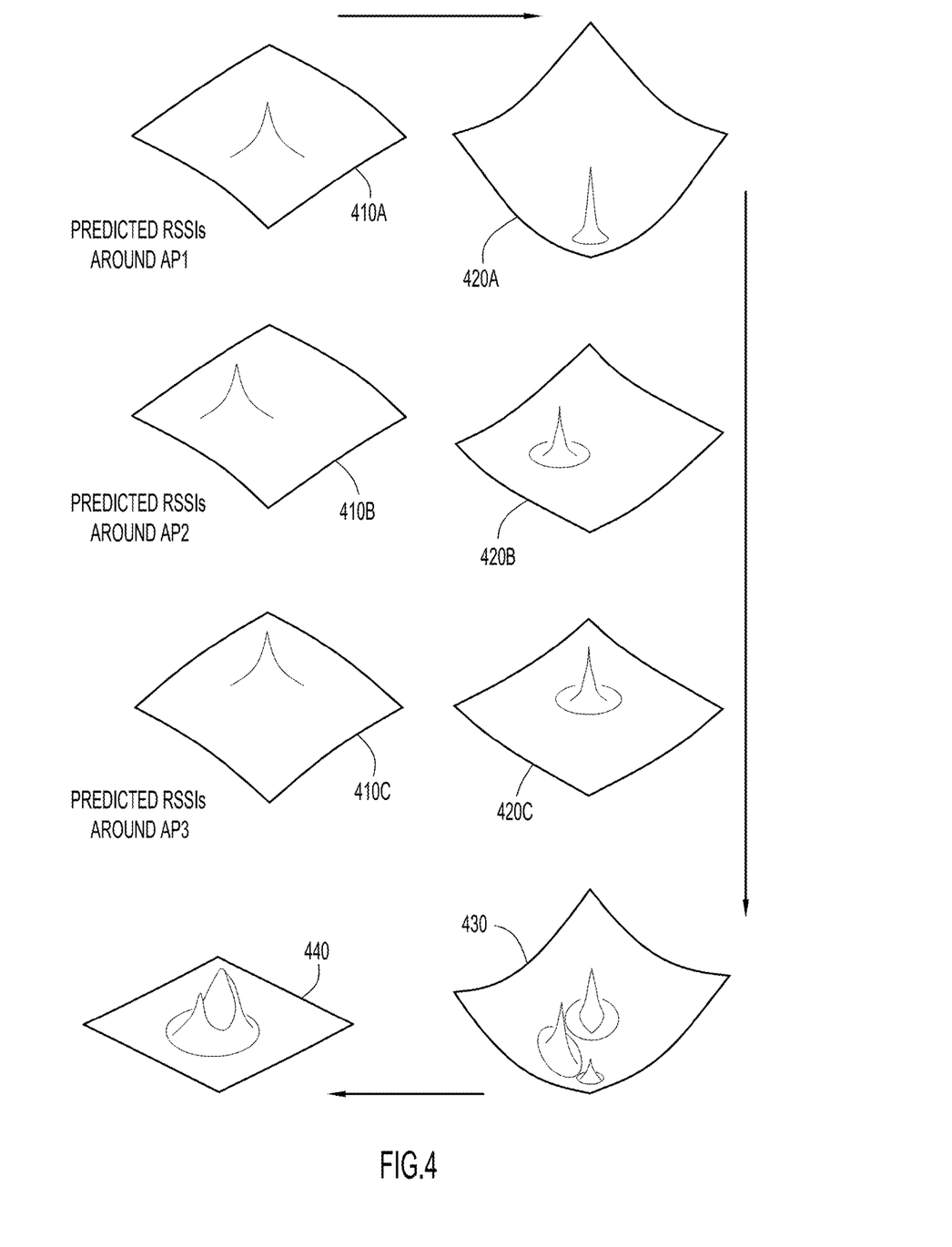
FIG. 4 is a diagram depicting combining heat maps of Received Signal Strength Indication (RSSI) data to estimate the location of the wireless mobile client device, according to an example embodiment.

Referring now to FIG. 4, a diagram is shown that illustrates combining heat map representations of predicted RSSI output from three access points to create an RSSI fingerprint for a specific area. Heat maps 410A, 410B, and 410C shows the predicted RSSI values surrounding access points 110A, 110B, and 110C, respectively. An RSSI value measured from transmissions 310 at each access point 110A, 110B, and 110C is subtracted from each point on the heat maps 410A, 410B, and 410C, respectively. The value at each point is then squared to generate cost curves 420A, 420B, and 420C, respectively. The individual cost curves are point-wise summed to form a total cost curve 430. Taking the exponential of the total cost curve 430 yields a probability function 440 of the location of the mobile device 130.

By using the known locations of the access points as anchor nodes, the location engine 160 may determine a rough location estimate from knowledge of multiple distance and/or direction measurements. However, the location estimate of a target device can be improved by including distance and/or direction measurements between non-anchor nodes (e.g., the beacon devices 120A, 120B, 120C, and 120D) and both the anchor nodes (e.g., the access points 110A, 110B, 110C, and 110D with known locations) and the target device (e.g., the mobile client device 130).

Referring back to FIG. 3, the location data (i.e., distance and/or direction data) associated with transmissions 320 may be measured at the access points and sent to the location engine 160 as part of transmissions 340 over network 150. The location data associated with transmissions 330 may be measured at the mobile device 130, and subsequently transmitted to an access point to which the mobile device 130 is associated. The access point can then forward the location data associated with transmissions 330 (i.e., between the beacon devices and the mobile device) to the location engine 160 as part of the transmissions 340.

Once the location engine 160 has obtained location data associated with each of the transmissions 310 (or 315), 320, and 330, it may more precisely estimate the location of the mobile device 130 and determine the locations of the beacon devices as well. In one example, the location engine determines the locations of the beacon devices, and then uses the known/calculated locations of the access points and beacon devices, along with the location data from the client-to-access point and beacon-to-client transmissions, to estimate the location of the mobile client device through a location algorithm, including RSSI fingerprinting. In another example, the location engine 160 considers only the access point locations as known, and jointly estimates the beacon device locations and the location of the mobile client device using the client-to-access point data, the beacon-to-access point data, and the beacon-to-client data.

Figure 5:
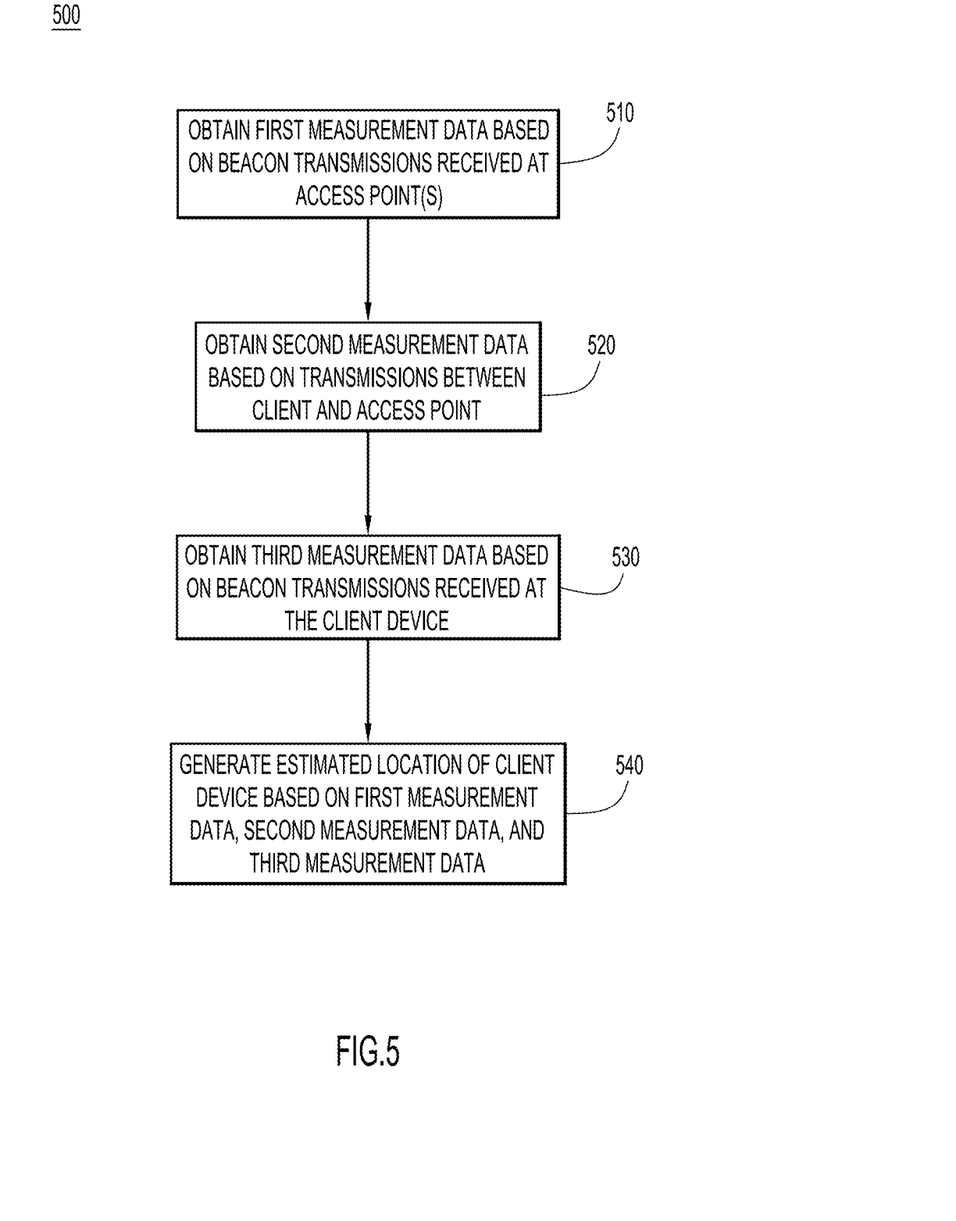
FIG. 5 is a flow chart illustrating operations to estimate the location of the wireless mobile client device, according to an example embodiment.

Referring now to FIG. 5, with continued reference to FIG. 3, an example process 500 is now described for operations performed by the location engine 160 to estimate the location of the mobile client device, according to example embodiments presented herein. In step 510, the location engine 160 obtains a first set of measurement data based on the transmissions 320 from the beacon devices that are received at the access points. In step 520, the location engine 160 obtains a second set of measurement data based on the transmissions between the mobile client device and the access points. In step 530, the location engine 160 obtains a third set of measurement data based on the transmission 330 from the beacon devices that are received at the client device. In one example, the third set of measurement data is obtained from the client device through at least one of the access points to which the mobile client device is associated. In step 540, the location engine estimates the location of the client device based on the first measurement data, the second measurement data, and the third measurement data.

In one example, the locations of the beacon devices may be known to the location engine, and the estimated location of the client device is generated from the known locations of the access points and the known locations of the beacon devices. In this example, the access point locations and beacon device locations are treated as "anchor nodes," and the location of the client device is treated as a "non-anchor node" in estimating its position. A heat map framework may be used for the location data, and a beacon device heat map may be generated and integrated into the overall heat map. This allows for an accurate location solution for the client device to be formulated using an existing heat map framework.

In another example, only the locations of the access points may be known, and the location of the client device is estimated jointly with the locations of the beacon devices. In this example, the locations of the access points are treated as anchor nodes, and the locations of the beacon devices and the client device are treated as non-anchor nodes in estimating the location of the client device.

Figure 6:
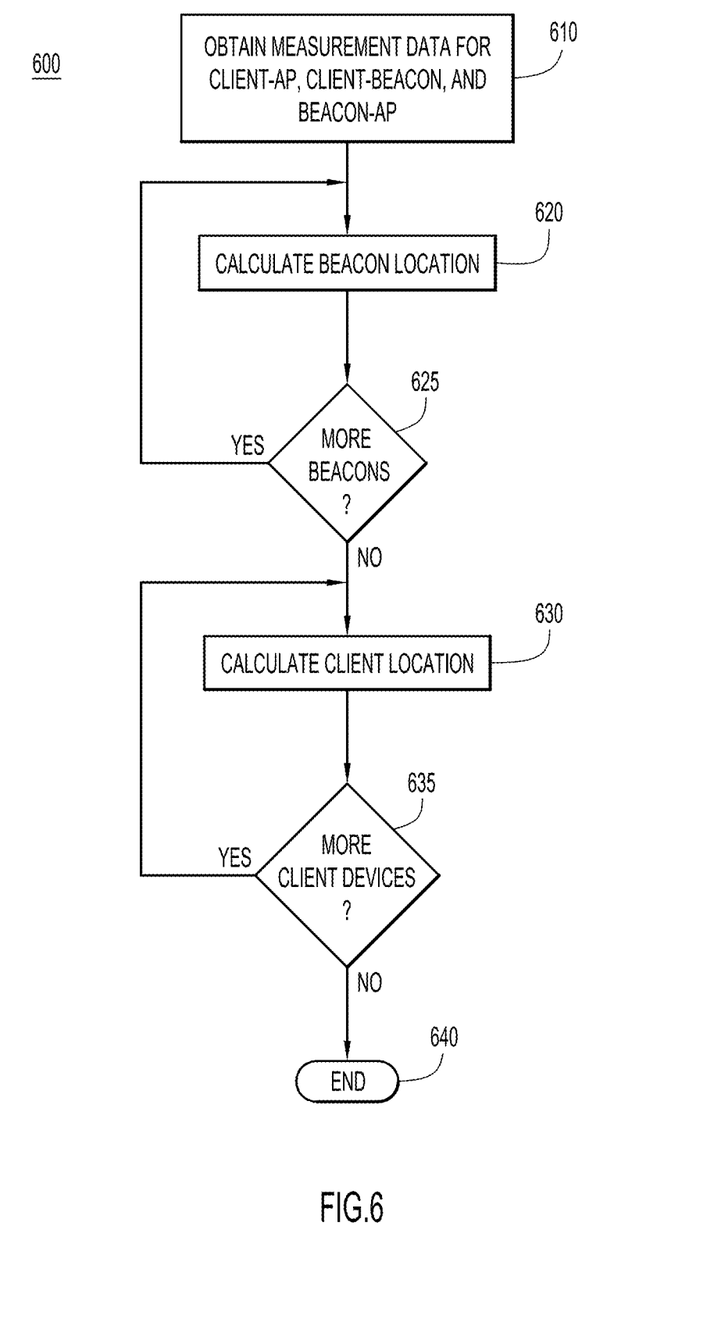
FIG. 6 is a flow chart illustrating an algorithm used to estimate the location of wireless mobile client device(s) and wireless beacon devices, according to an example embodiment.

Referring now to FIG. 6, an example process 600 is described of the operations that the location engine 160 may perform to determine the locations of any mobile client devices and any beacon devices. In step 610, the location engine obtains measurement data based on three sets of wireless transmissions: (1) wireless transmissions between a client device and an access point, (2) wireless transmissions from a beacon device that are received at a client device, and (3) wireless transmissions from a beacon device that are received at an access point. Based on the obtained measurement data, the location engine 160 calculates the location of a beacon device at step 620. The location engine 160 continues to calculate the location of additional beacon devices until there are no more beacons that have not been located, as determined in step 625. Once all of the beacon devices have been located, the location engine 160 calculates a location of a mobile client device at step 630. If there is more than one client device to be located, as determined in step 635, the location engine 160 continues to calculate the location of subsequent client devices. Once all of the client devices have been located, the process ends at step 640.

The process 600 involves first determining all of the locations of the beacon devices and subsequently determining the locations of the client devices. Alternatively, the location engine may first calculate the locations of the client devices, and subsequently compute the locations of the beacon devices. In one example, the location engine continually updates the client device locations and the beacon device locations, alternatingly. Alternatively, once the beacon device locations have been calculated, the location engine may save these as known locations, and only update the locations of the client devices.

In one example, the beacon devices are located using a suitable network, such as a Wireless Local Area Network (WLAN), with devices (e.g., access points) having the capability to receive multiple wireless communication protocols (e.g., IEEE 802.11 protocols, Bluetooth Low Energy protocol, etc.), as described later with respect to FIG. 8. After the beacons are located, a location server may use the client-to-access point measurement information (e.g., RSSI information) and beacon-to-client measurement information (e.g., RSSI information) delivered through an upper layer (e.g., a proprietary application on the client device) to enhance the accuracy of an estimate of the location of a client device.

Figure 7:
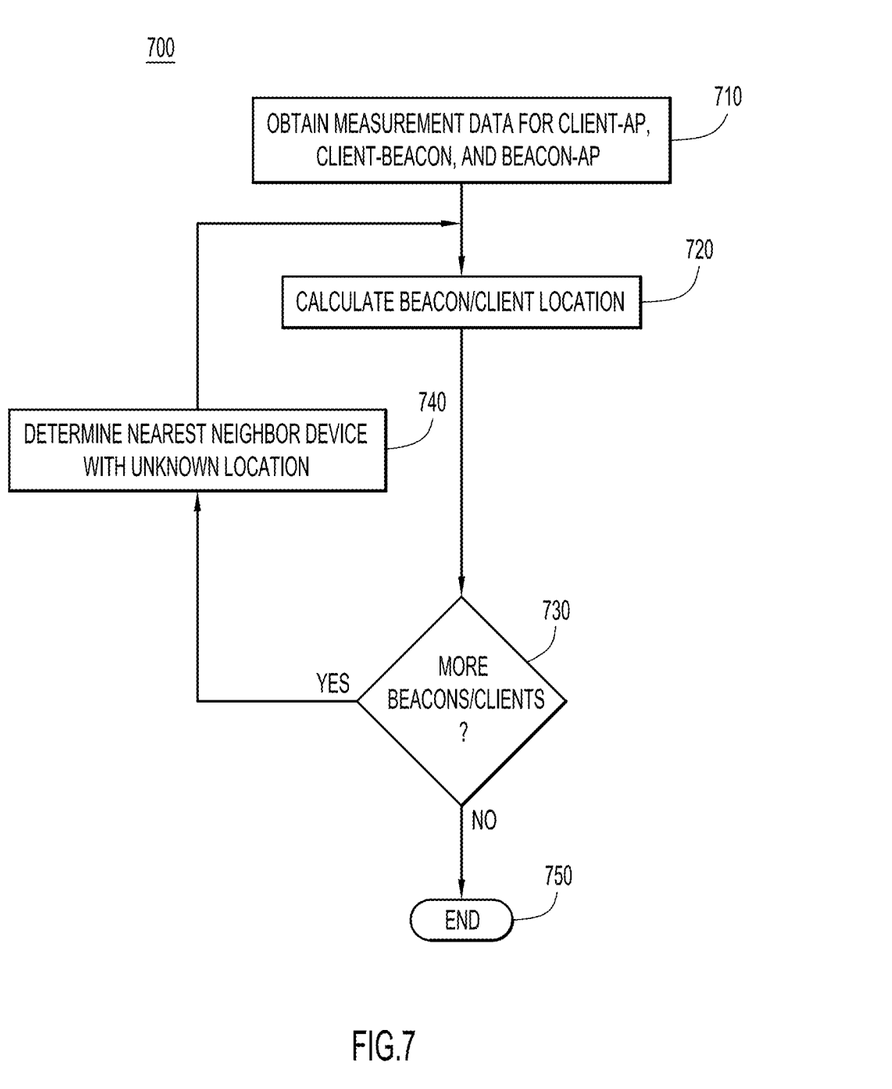
FIG. 7 is a flow chart illustrating another algorithm used to estimate the location of wireless mobile client device(s) and wireless beacon devices, according to an example embodiment.

Referring now to FIG. 7, an example process 700 is now described of the operations that the location engine 160 may perform to determine the locations of any beacon devices and any mobile client devices. In step 710, the location engine 160 obtains measurement data based on three sets of wireless transmissions: (1) wireless transmissions between a client device and an access point, (2) wireless transmissions from a beacon device that are received at a client device, and (3) wireless transmissions from a beacon device that are received at an access point. Based on the obtained measurement data the location engine 160 calculates the location of either a client device or a beacon device at step 720. After determining, at step 730, that the locations of additional client devices and/or beacon devices have not been calculated, the location engine 160 determines the nearest neighbor device with an unknown location at step 740. The location engine 160 then calculates the location of the determined nearest neighbor in the next iteration of step 720. Once the locations of all of the beacon devices and client devices have been calculated, as determined in step 730, then the process ends in step 750.

In some examples of either process 600 or process 700, the location engine 160 may iteratively repeat the process for a predetermined number of iterations. In other examples, the location engine 160 may iteratively repeat the process until a quality metric (e.g., a probability peak) for the locations reaches a predetermined level. In further examples, the location engine 160 may iteratively repeat the process until the calculated location values converge, i.e., the change in location values between iterations is smaller than a predetermined value.

One example of an iterative joint solution calculates the location of client devices and beacon devices iteratively according to the following algorithm:

Step 0: Calculate client devices locations (clientXYhat(i)) conventionally, e.g., using RSSI fingerprinting from access points.

Step 1: Calculate the beacon device locations (BeaconXYhat(j)) according to:

$$\text{Beacon}XY\text{hat}(j)=\text{argmax }[\text{Beacon}XY(j)*p(\text{RSSI-at-AP-of-beacon},\text{RSSI-at-client-of-beacon}|\text{Beacon}XY(j),\text{client}XY\text{hat}(i))],$$

where argmax(A(x)) is the set of points which maximizes A(x), BeaconXY(j) is the previously determined location of the $j^{th}$ beacon device, and p(x,y|B,C) is the joint probability of x=B and y=C.

Step 2: Calculate the client device locations (clientXYhat(i)) according to:

clientXYhat(i)=argmax[clientXY(i)*p(RSSI-at-AP-of-client,RSSI-at-client-of beacon|BeaconXYhat, clientXY(i)], where argmax(A(x)) is the set of points which maximizes A(x), clientXY(i) is the previously determined location of the $i^{th}$ client device, and p(x,y|B,C) is the joint probability of x=B and y=C.

Step 3: Stop after a fixed number of iterations, a high enough quality metric (e.g., a high probability peak), or convergence (i.e., the change in BeaconXYhat(j) or clientXYhat(i) is smaller than a predetermined amount); else return to Step 1.

This algorithm is an extension of a heatmap-based solution that involves stacking beacon heatmaps on top of access point heat maps. However, in this improved algorithm, there is one beacon heatmap per client, instead of per access point (where the client locations are assumed to be known). This algorithm recalculates the client heatmaps at each iteration. In a modified version of the iterative algorithm described above, the beacon and client location calculations may be intermingled. In this modified example, the calculations may be ordered by proximity (e.g., the next nearest neighbor—client or beacon) rather than calculating the client locations in a predefined order followed by calculating the beacon locations in a predefined order.

Figure 8:
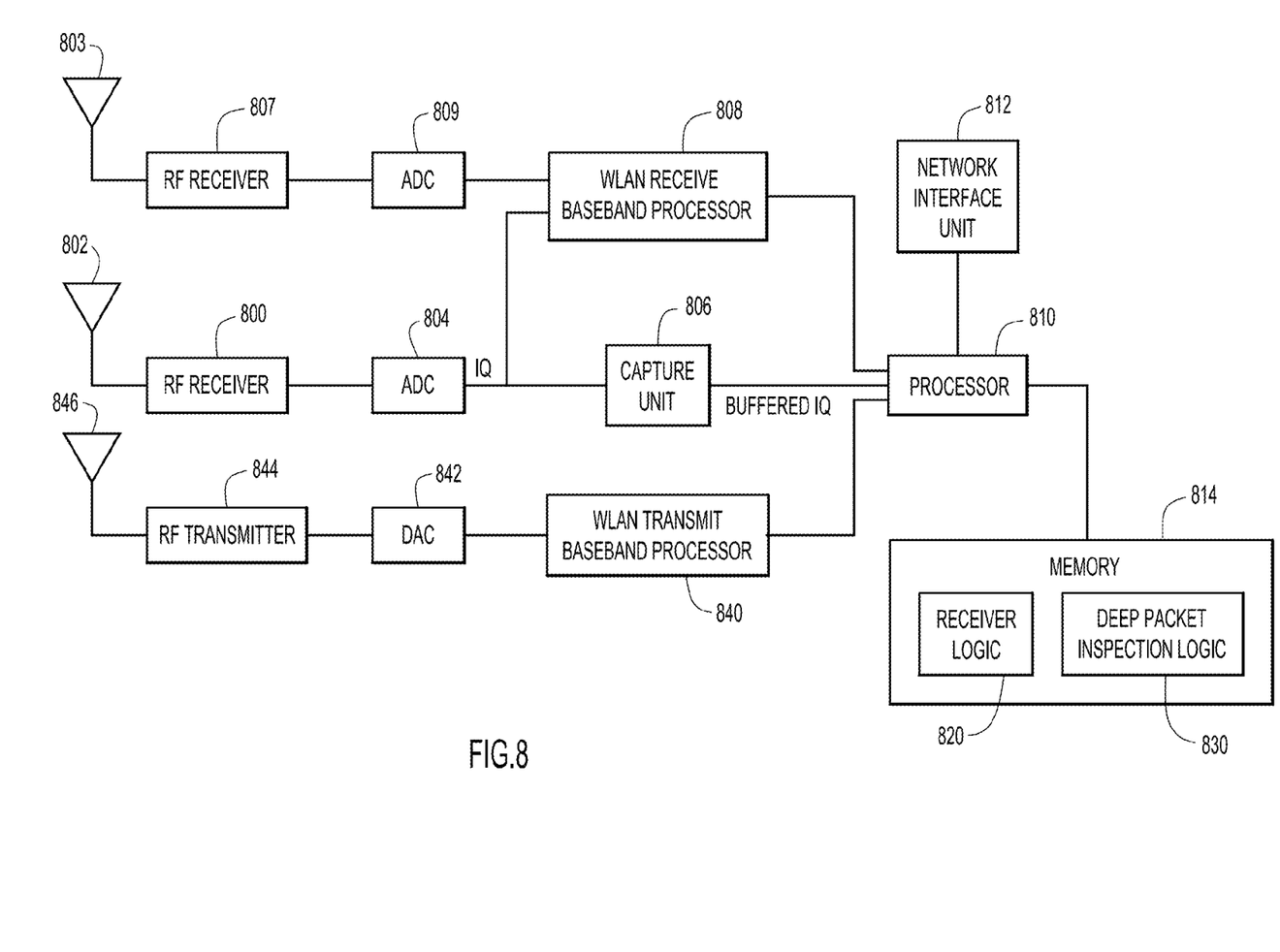
FIG. 8 is a block diagram of an access point capable of receiving and decoding multiple transmission formats, according to an example embodiment.

Reference is now made to FIG. 8. FIG. 8 illustrates an example block diagram of any of the access points 110A, 110B, 110C, or 110D. In one example, each access point includes a radio frequency (RF) receiver (downconverter) 800 connected to an antenna 802. The output of the RF receiver 800 is supplied to an analog-to-digital converter (ADC) 804. The digital output from the ADC 804 is supplied to a capture unit 806 and to a WLAN receive baseband processor 808. In one variation, a separate and dedicated RF receiver is provided for each of the capture unit 806 and the WLAN receive baseband processor 808. For example, RF receiver 800 and ADC 804 may be dedicated to the capture unit 806, and RF receiver 807 (with associated antenna 803) and ADC 809 are dedicated to the WLAN receive baseband processor 808. In such a situation, the RF receiver 807 dedicated to the WLAN receive baseband processor 808 may be part of a WLAN RF transceiver. Further, it should be understood that the RF receiver 800 may be part of an RF transceiver. Moreover, in order to receive signals in both the 2.4 GHz band and 5 GHz band, an access point may include still another RF transceiver dedicated to the 5 GHz band.

The access point further includes a processor 810, a network interface unit 812 and memory 814. The processor 812 is a microprocessor or microcontroller, for example. The processor 812 executes instructions stored in memory 814, including instructions for receiver logic 820 and deep packet inspection logic 830.

Memory 814 may comprise read only memory (ROM), random access memory (RAM), magnetic disk storage media devices, optical storage media devices, flash memory devices, electrical, optical, or other physical/tangible memory storage devices. Thus, in general, the memory 814 may comprise one or more tangible (non-transitory) computer readable storage media (e.g., a memory device) encoded with software comprising computer executable instructions and when the software is executed (by the processor 810) it is operable to perform the operations described herein in connection with the receiver logic 820 and deep packet inspection logic 830.

While FIG. 8 shows that the receiver function is performed by way of software, this is not meant to be limiting. It is also possible to have a dedicated hardware module/block that acts as an extra/third radio dedicated to decoding beacon packets for beacon movement/tracking The access point is further provided a WLAN transmit baseband processor 840, a digital-to-analog converter (DAC) 842, an RF transmitter 844 and one or more antennas 846 for use by the RF transmitter 844. The WLAN receive baseband processor 808 and the WLAN transmit baseband processor 840 may be integrated as part of a single application specific integrated circuit (ASIC) that performs modem functions of a WLAN access point. Likewise, the RF receiver 800 and RF transmitter 844 may be part of a WLAN RF transceiver. Further still, the same one or more antennas used for RF receiving may be used for RF transmission.

The capture unit 806 is, for example, a hardware block implemented in digital logic gates as part of or separate from a modem. The ADC 804 may output in-phase (I) and quadrature-phase (Q) receive data (denoted "IQ" in FIG. 8) from I and Q receive signals output by the RF receiver 800. The capture unit 806 buffers the IQ receive data for output to the processor 810.

The processor 810 executes the instructions for the receiver logic 820 to analyze the buffered IQ samples output by the capture unit 806 in order to perform start and end of wireless packet detection, as well as automatic gain control (AGC), carrier recovery, timing recovery and equalization to detect wireless packets. Moreover, the receiver logic 820 performs the function of identifying the appropriate portion of a wireless packet to obtain an accurate Receive Signal Strength Indication (RSSI) or other signal characteristic measurement of a detected/received packet, based on output from the capture unit 806. Thus, the capture unit 806 outputs IQ samples along with RSSI values for the samples. Still another function of the receiver logic 820 is to dwell on channels on which the wireless packets (e.g., packets from a beacon device) are expected to be transmitted. These channels may be in between WLAN (Wi-Fi) channels. Thus, in executing the receiver logic 820, the processor 810 controls the channel of the RF receiver 800 to dwell on the beacon channels. The processor 810 may generate, as output from execution of the receiver logic 820, bits that make up a packet received from a beacon device or from a mobile client device.

The processor 810 executes the deep packet inspection logic 830 to perform cyclic redundancy checking, and to obtain content of one or more fields of the wireless packets. The content of one or more fields of the wireless packet may be used to identify the source of a wireless packet, that is, the beacon device or mobile client device from which the packet is received. The one or more fields may contain one or more identifiers that are used to identify a device that transmitted the packet. Furthermore, a particular piece of information contained in a field of the wireless packet may include information useful for path loss estimation. For example, the wireless packet may include a calibration value, such as RSSI at a particular distance, e.g., 1 meter, antenna type of the transmitting device, which can be used to derive the transmit power that was used to transmit the wireless packet, which, together with the actual measured RSSI of the wireless packet, can be used to compute a path loss for location computations, i.e., path loss=transmit power−RSSI. Thus, to summarize, a calibration value can be obtained from a received wireless packet, where the calibration value indicates a receive signal strength at a predetermined distance, and a transmit power used to transmit the wireless packet is derived based on the calibration value to enable computation of a path loss using the transmit power and receive signal strength associated with reception of the wireless packet at one of the access points.

In the case of BLE beacon devices, as explained above, BLE transmissions are on channels that are between Wi-Fi channels. As a result, for access points which do not have a separate radio receiver/transceiver dedicated to monitoring (e.g., RF receiver 800 shown in FIG. 8), an algorithm may be performed to control the WLAN access points to go off of Wi-Fi channels to the special channels where the BLE transmissions will occur.

In the case in which a separate radio receiver is not available in a WLAN access point for dedicated beacon packet monitoring, the following is an example of a scheduling algorithm that may be used to go off-channel in order to detect beacon packets. First, the number of off-channel scans for beacons may be limited, e.g., 1 scan every 25 ms, per minute.

Beacon packets may be transmitted at regular time intervals. Therefore, the timing phases of off-channel scans will be roughly aligned, so that they cover the full period over time. Taking the example of a 100 ms period, five phases may be allocated to cover the period.

In the case of the 2.4 GHz band in the United States, which has three frequently used non-overlapping channels, rather than scanning all three frequencies at once on which a beacon packet may be transmitted, which would create a longer service outage with more impact to WLAN service, a different frequency is visited per off-channel scan. Scanning on any of the three frequencies should be able to result in detection, so the inclusion of all three frequencies can increase detection probability.

Since the numbers three (frequencies) and five (phases) are relatively prime, all phases and frequencies would be visited once every fifteen dwells. Randomization to the order may be applied such that the fifteen frequency-phase possibilities are visited to break up such unwanted synchronization. Similarly, a small random jitter may be added into the nominal time so that beacon packet pulses near the edges do not require waiting for a long phase drift to separate.

Detection and demodulation of narrow band signals can be impaired when other signals are nearby in the band. Since specific frequencies are targeted, frequency filters may be applied to limit a search to a smaller frequency range than the full dwell. Rather than processing a 20 MHz block of spectrum, the search may be limited to a couple MHz around the nominal frequency.

Finally, channel scanning may already enable the 11 U.S. channels in the 2.4 GHz band. Since these are overlapping channels, several of them would be expected to overlap the middle frequency used by a beacon device. This time can also be examined, and may speed up detection in simpler RF environments, as well as increase the update rate for location measurements.

In summary, the location engine uses additional location information to locate beacon devices and enhance the accuracy of the estimated location of a mobile client device. By using measurement information obtained from transmissions between the access points and the beacon devices, transmissions between the client device and the access points, and transmissions between the beacon devices and the client device, the location engine can provide location-based services to a client device based on a more accurate estimated location of the client device.

In one form, a method is provided for obtaining a first set of measurement data based on wireless transmissions from the one or more beacon devices received at one or more wireless access points operating in a wireless network. A second set of measurements and a third set of measurements are also obtained. The second set of measurements is associated with wireless transmission between a wireless client device and the one or more wireless access points. The third set of measurements is associated with wireless transmissions from the one or more beacon devices received at the wireless client device. An estimated location of the wireless client device is generated based on the first set of measurement data, the second set of measurement data, and the third set of measurement data.

In another form, an apparatus is provided comprising a network interface, a memory, and a processor coupled to the memory and the network interface unit. The network interface unit enables the apparatus to communicate over a network. The processor obtains a first set of measurement data based on wireless transmissions from the one or more beacon devices received at the one or more wireless access points operating in a wireless network. The processor obtains a second set of measurement data associated with wireless transmissions between a wireless client device and the one or more wireless access points. The processor obtains a third set of measurement data associated with wireless transmissions from the one or more beacon received at the wireless client device. The processor generates an estimated location of the wireless client device based on the first set of measurement data, the second set of measurement data, and the third set of measurement data.

In yet another form, a system is provided comprising one or more wireless access points and a wireless network controller. The wireless access points communicate with a wireless client device in a wireless network according to a first wireless communication protocol and receive wireless transmissions according to a second wireless communication protocol form one or more beacon devices. The wireless network controller obtains a first set of measurement data based on the wireless transmissions from the one or more beacon devices received at the one or more wireless access points. The wireless network controller obtains a second set of measurement data associated with wireless transmissions between the wireless client device and the one or more wireless access points. The wireless network controller obtains a third set of measurement data associated with wireless transmissions from the one or more beacon devices received at the wireless client device. The wireless network controller generates an estimated location of the wireless client device based on the first set of measurement data, the second set of measurement data, and the third set of measurement data.

The above description is intended by way of example only. Various modifications and structural changes may be made therein without departing from the scope of the concepts described herein and within the scope and range of equivalents of the claims.

What is claimed is:
1. A method comprising:
 obtaining a first set of measurement data associated with wireless transmissions from one or more beacon devices received at one or more wireless access points operating in a wireless network;
 obtaining a second set of measurement data associated with wireless transmissions between a wireless client device and the one or more wireless access points, wherein the wireless transmissions between the wire- less client device and the one or more wireless access points are transmitted in accordance with a first wireless protocol;

obtaining a third set of measurement data associated with wireless transmissions from the one or more beacon devices received at the wireless client device, wherein the wireless transmission from the one or more beacon devices that are received at the wireless client device are transmitted in accordance with a second wireless communication protocol; and generating an estimated location of the wireless client device based on the first set of measurement data, the second set of measurement data, and the third set of measurement data.

2. The method of claim 1, wherein the wireless transmissions received at the one or more wireless access points from the one or more beacon devices are transmitted in accordance with the second communication protocol.

3. The method of claim 1, wherein the first wireless communication protocol is an IEEE 802.11 communication protocol and the second wireless communication protocol is a Bluetooth Low Energy communication protocol.

4. The method of claim 1, wherein the first set of measurement data includes a set of measurements of distance and/or direction between the one or more beacon devices and the one or more wireless access points.

5. The method of claim 1, wherein the second set of measurement data includes a set of measurements of distance and/or direction between the wireless client device and the one or more wireless access points.

6. The method of claim 5, wherein the measurements of distance and/or direction are selected from the group consisting of: Received Signal Strength Indicator (RSSI) data, Time of Flight (TOF) data, Differential Round Trip Time (DRTT) data, and Angle of Arrival (AoA) data.

7. The method of claim 1, wherein the third set of measurement data includes a set of measurements of distance or measurements of direction between the wireless client device and the one or more beacon devices.

8. The method of claim 1, further comprising generating a plurality of heat maps, each heat map corresponding to a measurement in either the second set of measurement data or the third set of measurement data, wherein generating the estimated location of the wireless client device comprises overlaying the plurality of heat maps to generate a combined heat map representative of the estimated location of the wireless client device.

9. The method of claim 1, wherein generating the estimated location of the wireless client device is based on known locations of the one or more wireless access points and known or estimated locations of the one or more beacon devices.

10. The method of claim 1, wherein generating the estimated location of the wireless client device comprises jointly estimating locations of the one or more beacon devices and the location of the wireless client device based on the first set of measurement data, the second set of measurement data, and the third set of measurement data, and based on known locations of the wireless access points.

11. An apparatus comprising:
a network interface unit to communicate over a network;
a memory; and
a processor coupled to the memory and the network interface unit, wherein the processor:
obtains a first set of measurement data associated with wireless transmissions from the one or more beacon devices received at one or more wireless access points operating in a wireless network;

obtains a second set of measurement data associated with wireless transmissions between a wireless client device and the one or more wireless access points, wherein the wireless transmissions between the wireless client device and the one or more wireless access points are transmitted in accordance with a first wireless protocol;

obtains a third set of measurement data associated with wireless transmissions from the one or more beacon devices received at the wireless client device, wherein the wireless transmission from the one or more beacon devices that arc received at the wireless client device are transmitted in accordance with a second wireless communication protocol; and generates an estimated location of the wireless client device based on the first set of measurement data, the second set of measurement data, and the third set of measurement data.

12. The apparatus of claim 11, wherein the processor generates the estimated location of the wireless client device based on known locations of the one or more wireless access points and known or estimated locations of the one or more beacon devices.

13. The apparatus of claim 11, wherein the processor generates the estimated location of the wireless client device by jointly estimating locations of the one or more beacon devices and the location of the client device based on the first set of measurement data, the second set of measurement data, and the third set of measurement data, and based on known locations of the wireless access points.

14. A system comprising:
one or more wireless access points to:
communicate with a wireless client device in a wireless network according to a first wireless communication protocol; and
receive wireless transmissions according to a second wireless communication protocol from one or more beacon devices; and
a wireless network controller to:
obtain a first set of measurement data associated with the wireless transmissions from the one or more beacon devices received at the one or more wireless access points;
obtain a second set of measurement data associated with wireless transmissions between the wireless client device and the one or more wireless access points, wherein the wireless transmissions between the wireless client device and the one or more wireless access points are transmitted in accordance with the first wireless communication protocol;
obtain a third set of measurement data associated with wireless transmissions from the one or more beacon devices received at the wireless client device, wherein the wireless transmissions that are received by the wireless client device from the one or more beacon devices are transmitted in accordance with the second wireless communication protocol; and
generate an estimated location of the wireless client device based on the first set of measurement data, the second set of measurement data, and the third set of measurement data.

15. The system of claim 14, wherein the wireless network controller generates the estimated location of the client device based on known locations of the one or more wireless access points and known or estimated locations of the one or more beacon devices.

16. The system of claim 14, wherein the wireless network controller generates the estimated location of the client device by jointly estimating locations of the one or more beacon devices and the location of the client device based on the first set of measurement data, the second set of measurement data, and the third set of measurement data, and based on known locations of the wireless access points.

17. The system of claim 14, wherein the wireless transmissions received at the one or more wireless access points from the one or more beacon devices are transmitted in accordance with the second communication protocol.

18. The system of claim 14, wherein the first wireless communication protocol is an IEEE 802.11 communication protocol and the second wireless communication protocol is a Bluetooth Low Energy communication protocol.

19. The system of claim 14, wherein the one or more wireless access points receive wireless transmissions according to a second wireless communication protocol from one or more stationary client devices, and wherein the wireless network controller obtains the first set of measurement data associated with the wireless transmissions from the one or more stationary client devices received at the one or more wireless access points, and wherein the wireless network controller obtains the third set of measurement data associated with wireless transmissions from the one or more stationary client devices received at the wireless client device.

* * * * *